(12) United States Patent
Baum et al.

(10) Patent No.: US 7,760,790 B2
(45) Date of Patent: Jul. 20, 2010

(54) METHOD AND APPARATUS FOR TRANSMITTING WATERMARK DATA BITS USING A SPREAD SPECTRUM, AND FOR REGAINING WATERMARK DATA BITS EMBEDDED IN A SPREAD SPECTRUM

(75) Inventors: Peter Georg Baum, Hannover (DE); Walter Voessing, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 800 days.

(21) Appl. No.: 10/582,031

(22) PCT Filed: Sep. 13, 2004

(86) PCT No.: PCT/EP2004/010221

§ 371 (c)(1), (2), (4) Date: Jun. 7, 2006

(87) PCT Pub. No.: WO2005/059912

PCT Pub. Date: Jun. 30, 2005

(65) Prior Publication Data

US 2007/0116324 A1    May 24, 2007

(30) Foreign Application Priority Data

Dec. 11, 2003    (EP)    ................................. 03090430

(51) Int. Cl.
H04B 1/00    (2006.01)
(52) U.S. Cl. ...................... 375/130; 358/3.28; 375/140; 704/205; 713/176
(58) Field of Classification Search ........................ None
See application file for complete search history.

(56) References Cited

U.S. PATENT DOCUMENTS 4,926,440 A    5/1990   Mikoshiba et al.

(Continued)

FOREIGN PATENT DOCUMENTS

EP    0245037    11/1987

(Continued)

OTHER PUBLICATIONS

Loboguerrero: "Iterative Informed Audio Data Hiding Scheme using Optimal Filter" ICCT 2003, vol. 2, Apr. 9-11, 2003, pp. 1408-1411.

(Continued)

Primary Examiner—David C Payne
Assistant Examiner—Adolf Dsouza
(74) Attorney, Agent, or Firm—Robert D. Shedd; Joseph J. Opalach; Jerome G. Schaefer

(57)    ABSTRACT

Spread spectrum technology is used for watermarking digital audio signals. To retrieve a watermark signal information bit from the spread spectrum at the receiver or decoder side, the received or replayed spectrum is convolved with a spreading function that is time-inverse with respect to the original spreading function. The pseudo noise sequences are modulated on carrier frequencies which are inserted at one or more frequency bands into the spectrum of an audio signal. The watermark signal decoder checks the frequency bands occupied by such carriers. The frequency band occupation information is signaled in advance, i.e. is transmitted already together with the frame data for the current frame, such that the watermark signal decoder knows before processing the following audio signal frame which carrier frequencies are occupied and must be used for the corresponding carrier demodulation, and which carrier frequencies need not be checked and demodulated.

10 Claims, 2 Drawing Sheets

Figure 1:
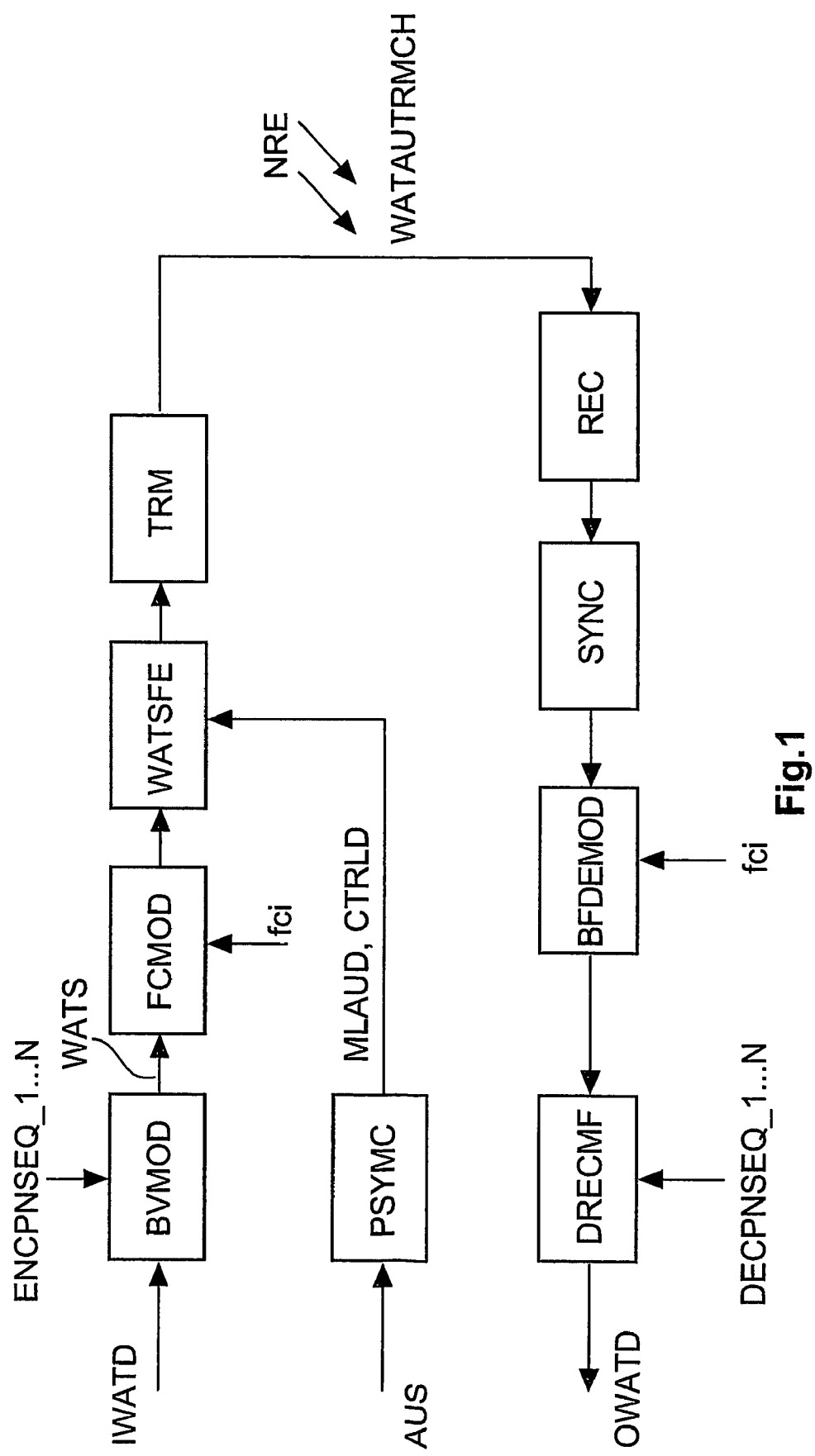

U.S. PATENT DOCUMENTS 5,319,735 A * 6/1994 Preuss et al. ............... 704/205
2003/0169804 A1* 9/2003 Kudumakis et al. ......... 375/143

FOREIGN PATENT DOCUMENTS

EP          0366381        5/1990

WO    WO 02/089370    11/2002

OTHER PUBLICATIONS

R. Petrovic et al: "Data hiding within audio signals" Telecommunications in Modern Satellite, Cable and Broadcasting Services, 1999, 4th Int'l Conference on NIS, Oct. 13-15, 1999, pp. 88-95.

Search Report Dated Nov. 30, 2004.

* cited by examiner

METHOD AND APPARATUS FOR TRANSMITTING WATERMARK DATA BITS USING A SPREAD SPECTRUM, AND FOR REGAINING WATERMARK DATA BITS EMBEDDED IN A SPREAD SPECTRUM This application claims the benefit, under 35 U.S.C. §365 of International Application PCT/EP04/010221, filed Sep. 13, 2004, which was published in accordance with PCT Article 21(2) on Jun. 30, 2005 in English and which claims the benefit of European patent application No. 03090430.4, filed Dec. 11, 2003.

The invention relates to a method and an apparatus for transmitting watermark data bits using a spread spectrum, and to a method and an apparatus for regaining watermark data bits embedded in a spread spectrum, wherein the watermark mark signals are arranged at frequency bands where an audio signal is notch filtered.

BACKGROUND

'Watermarking' means imperceptible insertion of information into multimedia data, e.g. audio data and/or video data. The insertion of additional information data, such as a number or a text, into multimedia data is performed through slight modification of the original multimedia data. Watermarking can be used for e.g. copyright protection, labelling (e.g. URL of a site or a site's logo), monitoring, tamper proofing, or conditional access.

Applying 'spread spectrum' in a (RF) communications system, means that a small baseband signal bandwidth is intentionally spread over a larger bandwidth by injecting or adding a higher-frequency signal, or spreading function. As a direct consequence, the energy used for transmitting the signal is spread over a wider bandwidth, and appears as noise.

Spread spectrum technology and the related inserted or added information signal can be used for implementing watermarking of e.g. digital audio signals, whereby the spread spectrum can use the complete audio spectrum from 0 Hz to one half of the sampling frequency. This spectrum carries the information of one bit.

In a modification of such systems shorter spread spectrum sequences are used leading to band limited spread spectrum signals, so that several ones of the band limited spread spectrum signals can be added at different centre frequencies to the audio spectrum, at which centre frequencies the original audio signal has been notch filtered, in order to increase the bitrate of the watermark signals and/or to prevent attacks on the watermarked signals. In this watermark system the spread spectrum signals are modulated on a carrier.

The watermark signals that are embedded in the audio signal should not be audible. But if the original audio signal spectrum has no sufficient energy level near a modulation frequency, the watermark signal will become audible. Therefore the watermark signals are inserted only in those frequency bands where the audio signal has substantial power, based on psycho-acoustic laws.

A known processing for retrieving at receiver or decoder side the watermark signal information bit from the spread spectrum is convolving the received or replayed spectrum with a spreading function or sequence that is time-inverse with respect to the original spreading function or sequence, which kind of processing is also called 'applying a matched filter'. If BPSK modulation was used for applying the spread spectrum function, the output of this process is a peak at the middle of the sequence of correlation overlap-add values, whereby the sign of such peak represents the value of the desired watermark signal information bit. If QPSK was used two peaks will be present in the sequence of correlation values, whereby each peak represents one bit value.

INVENTION

Because in prior art decoders the decoder has no a-priori information about which watermark signal carrier or carriers are currently available in a current audio frame, the decoder must check for all possible carrier frequencies in all candidate frequency bands whether a carrier is actually present. The disadvantage of this solution is that such checking for all possible carrier frequencies demands high processor power, i.e. leads to a multiplied MIPS (million instructions per second) demand.

A problem to be solved by the invention is to keep the robustness of modulated-carrier spread spectrum systems while reducing the required processing power for demodulating or decoding the watermark signal information bits. This problem is solved by the methods disclosed in claims 1, 2, 3 and 4. Corresponding apparatuses which utilise these methods are disclosed in claims 4, 5, 6 and 7, respectively.

In some watermarking system applications, in which a certain encoder/decoder processing delay is acceptable, a forward-looking psycho-acoustic can be implemented, which means that at a given time instant, i.e. for a current audio signal frame, it is already known at encoder side in which frequency band or bands in the following audio signal frame the next watermark signal or signals, respectively, can be embedded. If this frequency band information is signalled in advance, i.e. is transmitted or transferred already together with the frame data for the current frame, the decoder knows before processing the following audio signal frame which carrier frequency or frequencies are occupied and must be used for the corresponding carrier demodulation, and which carrier frequencies need not be checked and demodulated.

The advantage of such inventive signalling-in-advance is a significantly reduced processing power or MIPS demand in the decoder. If on average e.g. 2 frequency bands out of in total e.g. 6 candidate frequency bands are used, the processing power requirements will amount to about one third only.

On the other hand, the robustness against all kinds of attacks, and the inaudibility of the watermark signals, can be increased by providing in total an increased number of candidate frequency bands, without need for more CPU power as compared to prior art technology.

This inventive decoding processing works fine in case undisturbed signal are received by the decoder. However, if the received input signals contain multipath or echo or reverberation distortions, the convolved output signals will contain more than one peak per watermark signal information bit (i.e. per convolution result) to be decoded so that, e.g. depending on the amplitude or power of the distortion peaks, it is difficult or in many cases even impossible to retrieve the correct watermark information bits.

Therefore an additional advantageous feature can be used. With respect to a watermark signal carrier-occupied frequency band in the current frame, according to the amount of the main echo delays or the mean echo delay, in a future audio signal frame, the time period of which frame correlates to that amount of echo delay, no watermark signal carrier is transmitted in the frequency band corresponding to that occupied frequency band. Thereby the echo from the watermark signal carrier in the occupied frequency band in the current frame will occur at a frequency band in the future frame where no watermark signal carrier is present, and the number of watermark signal bit errors due to echoes caused by multipath or reverberated reception conditions is substantially decreased. Preferably, the future audio signal frame is the audio signal frame following the current audio signal frame.

Figure 3:
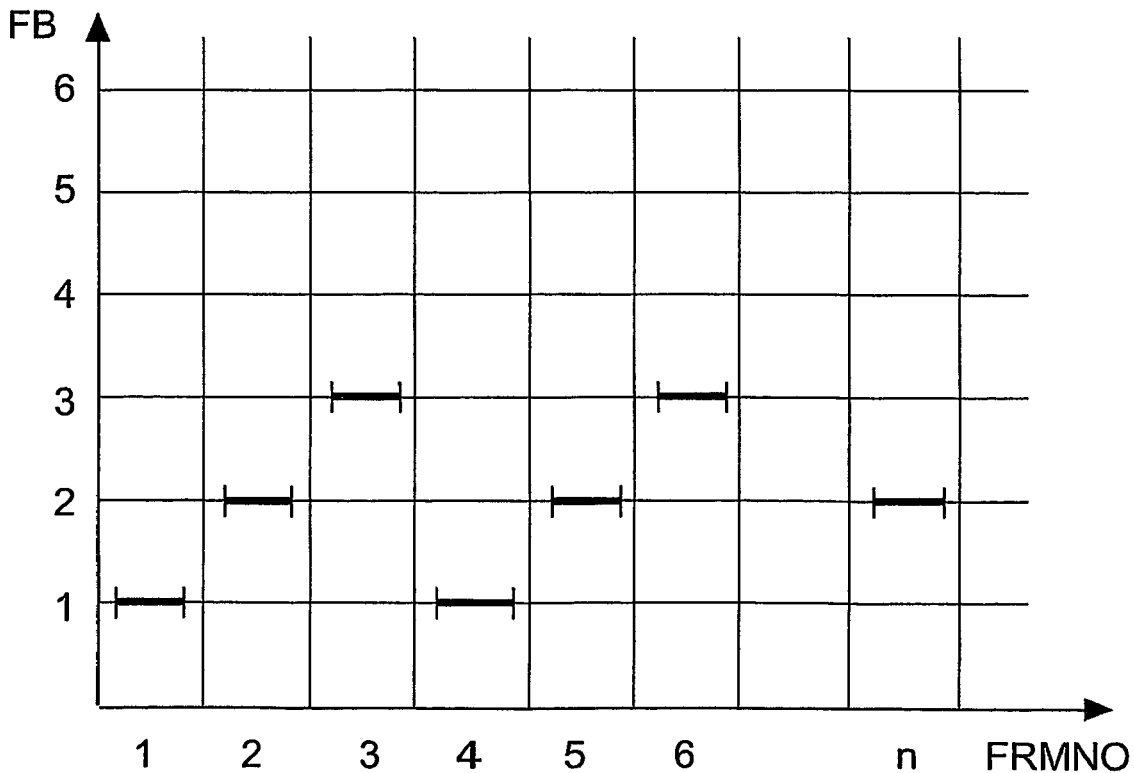

The latter features can also be used without signalling in advance the future-occupied frequency band or bands, by using a pre-determined pattern of differently occupied frequency band or bands in different audio signal frames, e.g. a regular pattern like staircase up (as depicted in FIG. 3) or staircase down.

In principle, the inventive method is suited for transmitting watermark data bits using a spread spectrum, said method including the steps:
- modulating said watermark data bits on an encoder pseudo-noise sequence;
- modulating said modulated encoder pseudo-noise sequence on a carrier frequency;
- determining whether at one or more different candidate frequency band positions in a current frame of said audio signal the energy or amplitude level of said audio signal is such that it can mask one or more, respectively, of said modulated carrier frequencies and, if this is true, notch filtering said audio signal at the corresponding frequency band positions and inserting at this frequency or at each of these frequencies, respectively, said carrier frequency or one of said carrier frequencies, respectively;
- checking at which candidate frequency band positions in a frame following said current frame of said audio signal the energy or amplitude level of said audio signal is such that it can mask one or more, respectively, of said modulated carrier frequencies, and providing information about the locations of these frequency band positions;
- transmitting or transferring data of said current audio signal frame carrying said watermark data bits together with the information about the locations of the frequency band positions to be used in said frame following said current frame of said audio signal.

In principle, the inventive method is suited for transmitting watermark data bits using a spread spectrum, said method including the steps:
- modulating said watermark data bits on an encoder pseudo-noise sequence;
- modulating said modulated encoder pseudo-noise sequence on a carrier frequency;
- notch filtering a current frame of said audio signal at frequency band positions which are arranged in a pre-defined pattern across the sequence of frames of said audio signal and inserting at this frequency band position or at each of these frequency band positions, respectively, in said current frame of said audio signal said carrier frequency or one of said carrier frequencies, respectively;
- transmitting or transferring data of said current audio signal frame carrying said watermark data bits.

In principle, the inventive method is suited for regaining watermark data bits embedded in a spread spectrum, whereby the corresponding original watermark data bits were modulated at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, and wherein a current audio signal frame carrying said watermark data bits was transmitted or transferred together with information about the locations of the frequency band positions used for said carrier frequencies in a frame following said current frame of said audio signal, said method including the steps:
- receiving and synchronising said transmitted or transferred audio signal;
- demodulating for a current audio signal frame said carrier frequency or said carrier frequencies, respectively, thereby using said information about the location or locations of the frequency band position or positions used for said carrier frequency or frequencies, respectively, which information was attached to the data for a previous frame of said audio signal;
- convolving said current frame of data of said audio signal with a time-inversed version of the encoder pseudo-noise sequence;
- determining from the sign of the peak or the peaks of the corresponding convolution result the value of a bit of said watermark data.

In principle, the inventive method is suited for regaining watermark data bits embedded in a spread spectrum, whereby the corresponding original watermark data bits were modulated at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, whereby said frequency band positions were arranged in a pre-defined pattern across the sequence of frames of said audio signal, said method including the steps:
- receiving and synchronising said transmitted or transferred audio signal;
- demodulating for a current audio signal frame said carrier frequency or said carrier frequencies, respectively, thereby using the information about said pre-defined pattern;
- convolving said current frame of data of said audio signal with a time-inversed version of the encoder pseudo-noise sequence;
- determining from the sign of the peak or the peaks of the corresponding convolution result the value of a bit of said watermark data.

In principle the inventive apparatus is suited for transmitting watermark data bits using a spread spectrum, said apparatus including:
- means for modulating said watermark data bits on an encoder pseudo-noise sequence;
- means for modulating said modulated encoder pseudo-noise sequence on a carrier frequency;
- means for determining whether at one or more different candidate frequency band positions in a current frame of said audio signal the energy or amplitude level of said audio signal is such that it can mask one or more, respectively, of said modulated carrier frequencies and which means, if this is true, notch filter said audio signal at the corresponding frequency band positions and insert at this frequency or at each of these frequencies, respectively, said carrier frequency or one of said carrier frequencies, respectively, and which means check at which candidate frequency band positions in a frame following said current frame of said audio signal the energy or amplitude level of said audio signal is such that it can mask one or more, respectively, of said modulated carrier frequencies, and provide information about the locations of these frequency band positions;
- means for transmitting or transferring data of said current audio signal frame carrying said watermark data bits together with the information about the locations of the frequency band positions to be used in said frame following said current frame of said audio signal.

In principle the inventive apparatus is suited for transmitting watermark data bits using a spread spectrum, said apparatus including:

means for modulating said watermark data bits on an encoder pseudo-noise sequence;

means for modulating said modulated encoder pseudo-noise sequence on a carrier frequency;

means for notch filtering a current frame of said audio signal at frequency band positions which are arranged in a pre-defined pattern across the sequence of frames of said audio signal, which means insert at this frequency band position or at each of these frequency band positions, respectively, in said current frame of said audio signal said carrier frequency or one of said carrier frequencies, respectively;

means for transmitting or transferring data of said current audio signal frame carrying said watermark data bits.

In principle the inventive apparatus is suited for regaining watermark data bits embedded in a spread spectrum, whereby the corresponding original watermark data bits were at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, and wherein a current audio signal frame carrying said watermark data bits was transmitted or transferred together with information about the locations of the frequency band positions used for said carrier frequencies in a frame following said current frame of said audio signal, said apparatus including:

means for receiving and synchronising said transmitted or transferred audio signal;

means for demodulating for a current audio signal frame said carrier frequency or said carrier frequencies, respectively, thereby using said information about the location or locations of the frequency band position or positions used for said carrier frequency or frequencies, respectively, which information was attached to the data for a previous frame of said audio signal;

means for convolving said current frame of data of said audio signal with a time-inversed version of the encoder pseudo-noise sequence, which means determine from the sign of the peak or the peaks of the corresponding convolution result the value of a bit of said watermark data).

In principle the inventive apparatus is suited for regaining watermark data bits embedded in a spread spectrum, whereby the corresponding original watermark data bits were modulated at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, whereby said frequency band positions were arranged in a pre-defined pattern across the sequence of frames of said audio signal, said apparatus including:

means for receiving and synchronising said transmitted or transferred audio signal;

means for demodulating for a current audio signal frame said carrier frequency or said carrier frequencies, respectively, thereby using the information about said pre-defined pattern;

means for convolving said current frame of data of said audio signal with a time-inversed version of the encoder pseudo-noise sequence, which means determine from the sign of the peak or the peaks of the corresponding convolution result the value of a bit of said watermark data.

Advantageous additional embodiments of the invention are disclosed in the respective dependent claims.

DRAWINGS

Figure 2:
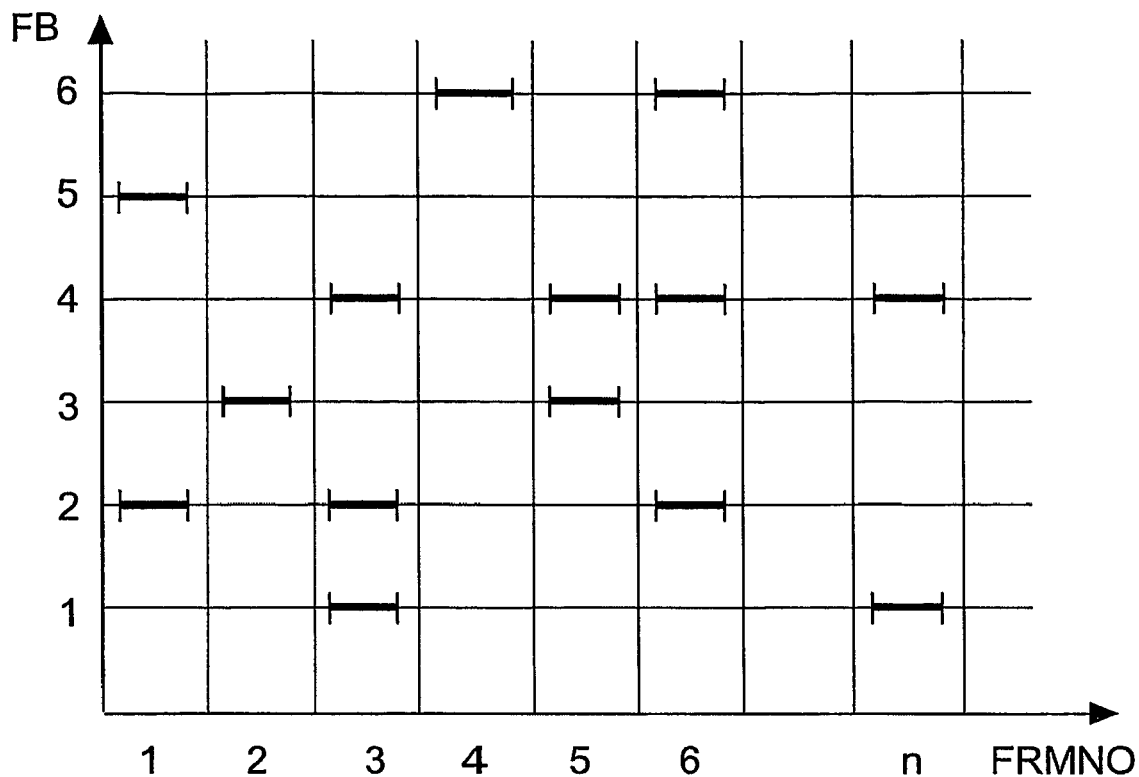

Exemplary embodiments of the invention are described with reference to the accompanying drawings, which show in:

FIG. 1 Watermark signal encoder and watermark signal decoder according to the invention, using spread spectrum technique;

FIG. 2 Audio signal masking level-dependent sample pattern showing which frequency group or groups in which frame carry a watermark signal;

FIG. 3 Regular sample pattern showing which frame in which frequency group can carry a watermark signal.

EXEMPLARY EMBODIMENTS

In the watermark signal encoder section in FIG. 1 an original audio input signal AUS is encoded, or processed such that the masking level threshold information or the energy level information for an encoding is retrieved, using a psycho-acoustic model calculator PSYMC. The resulting masking level threshold, or energy level, information MLAUD for the audio data or its frequency spectrum coefficients (resulting e.g. from an FFT or MDCT) of a current audio signal input frame are fed together with related control data or coding parameters CTRLD to a watermark shaping notch filtering and embedding stage WATSFE.

Input watermark data IWATD enter a bit value modulation stage BVMOD in which a current bit value of the IWATD data is used to correspondingly modulate a current encoder pseudo-noise sequence section ENCPNSEQ_i. For example, if the current bit value is '+1', the encoder pseudo-noise sequence section ENCPNSEQ_i is left unchanged whereas, if the current bit value is '0' or '−1', the encoder pseudo-noise sequence section ENCPNSEQ_i is inverted. Sequence ENCPNSEQ_i consists of e.g. a 'random' distribution of '0' or '−1' and '+1'. The pseudo-noise sequence section ENCPNSEQ_i can have a length corresponding to that of the audio signal frames. However, if two different sequences ENCPNSEQ_1 and ENCPNSEQ_2 are used each of which has a length that is one half of the audio data frame length (of e.g. 4096 samples), two watermark data bits per audio frame can be transmitted. If N different sequences ENCPNSEQ_1 to ENCPNSEQ_N are used, each one of them has a length of 1/N of the audio data frame length, and N watermark data bits per audio frame can be transmitted.

The pieces of watermark signals WATS resulting from stage BVMOD are fed to a frequency carrier modulator stage FCMOD wherein the watermark signals WATS are modulated on different frequency carriers $f_{ci}$, according to the frequency bands used.

The modulated watermark system depicted in FIG. 1 uses e.g. 6 carrier frequencies in 6 frequency bands as depicted in FIG. 2. In vertical direction the number of the frequency band FB is counted. In horizontal direction the number of the audio signal frame FRMNO is counted, i.e. the horizontal axis represents time whereas the vertical axis represents frequency. At every time instant, i.e. in every frame, between zero and 6 watermark signals can be inserted in the corresponding frequency bands, the number and location depending on the current masking level threshold or the current energy level.

In a subsequent watermark shaping, notch filtering and embedding stage WATSFE the output signal of stage MOD is combined with, or added to, corresponding frame sections of audio data.

If the audio signal to be transmitted is represented in the time domain, the audio signal is notch filtered at the carrier frequencies to be inserted, whereby the presence and/or amplitude of a carrier depends on the current masking level threshold or the current energy level of the audio signal. If the audio signal to be transmitted is represented in the frequency domain, the processing in stage WATSE is performed as follows. A current encoder pseudo-noise sequence section ENCPNSEQ_i is transformed into the frequency domain. In the frequency domain, this sequence is 'shaped' according to, i.e. its amplitudes envelope is made conforming to, the corresponding frame section masking level threshold or energy level shape or curve in masking level threshold information MLAUD.

In case there are e.g. two encoder pseudo-noise sequence sections per audio frame, sequence ENCPNSEQ_1 is shaped according to the masking level shape or curve in the first half of the audio frame and sequence ENCPNSEQ_2 is shaped according to the masking level shape or curve in the second half of the audio frame.

The frequency domain audio signal is notch filtered at the carrier frequencies to be inserted and the corresponding carriers are inserted instead, whereby the presence and/or amplitude of a carrier depends on the current masking level threshold or the current energy level of the audio signal.

For example, the audio signal to be watermarked at time instant 2 has only in the frequency band 3 enough energy to allow for an inaudible embedding of a watermark signal carrier. In a prior art watermark signal extractor all 6 bands must be decoded only to find that five of them do not contain any watermark signal.

As mentioned above, in some applications a delay of the length of one watermark data frame is acceptable. According to the invention, the psycho-acoustics relevant for audio data frame 2 can already be calculated before the watermark signal carriers for audio data frame 1 are inserted. As a result it is signalled to the decoder during the audio data frame 1 period that in audio data frame 2 frequency band 3 only will be occupied by a watermark signal carrier, and the decoder will decode this single band only. During the audio data frame 2 it is to the decoder that frequency bands 1, 2 and 4 will be occupied by a watermark signal carrier, and so on.

A watermark 'packet' is formed in stage WATSFE or in stage TRM, or in a non-depicted controller, from the watermark signals of several frames, each one of which frames carries one bit per frequency band used for a watermark signal (if there is used one encoder pseudo-noise sequence per frequency band). A watermark packet carries several bits of which one or more are used for signalling the occupation of the frequency bands in the, or a, following audio signal frame.

In a different embodiment, the feature of signalling in advance the future-occupied frequency band or bands is not required. A pre-determined pattern of differently occupied frequency band or bands in different audio signal frames is used, e.g. a regular pattern like that in FIG. 3. Thereby in each audio signal frame the same number of frequency bands is occupied, e.g. one or two per audio signal frame. The above-mentioned stages do not include the signalling information in the watermark packets. Because of the regular pattern and the irregular audio signal masking level threshold or energy level threshold, either all watermark signal carriers have an equal low amplitude, or have different (i.e. adaptive) amplitudes.

The output signal of stage WATSFE passes through transmitter stage TRM (which includes e.g. a D/A converter and/or an amplifier) and channel WATAUTRMCH to a watermark signal decoder or receiver.

Unintended, in the watermarked audio transmission channel WATAUTRMCH a noise or reverberation or echo signal NRE is added. This channel can be represented by an acoustic connection between a loudspeaker and a microphone.

In the watermark signal decoder section in FIG. 1 the distorted transmitted signal enters a receiver stage REC, wherein e.g. a coarse synchronisation and/or an A/D conversion is performed. Its output signal passes via a bit or fine synchronisation stage SYNC and a band filter and demodulater modulator stage BFDEMOD to a data recovery matched filter stage BFDEMOD, or time-inverse convolution stage DRECMF. In stage BFDEMOD the carrier-modulated watermark signals in the different frequency bands are demodulated using a carrier frequency $f_{ci}$ corresponding to that used in stage FCMOD in the watermark signal encoder. Also, the above-mentioned signalling information contained in the watermark packets is retrieved in case no regular pattern-occupation of frequency bands was used. Stage BFDEMOD convolves, or filters, the carrier-demodulated watermark signals of a current incoming audio frame coming from stage BFDEMOD with a decoder pseudo-noise sequence ENCPNSEQ_i that is pre-known by, or stored in, the decoder and is time-inverse to the related encoder pseudo-noise sequence section ENCPNSEQ_i. Basically, a correctly transmitted watermark bit 'appears' as a peak in the middle of the 2*N−1 intermediate correlation results. However, due to echo signals a peak could occur at the same or a different position.

In case e.g. two orthogonal encoder pseudo-noise sequence sections per frequency band per audio frame were used in the watermark signal encoder, sequence DECPNSEQ_1 is convolved with the first half of the corresponding frequency band signal and sequence DECPNSEQ_2 is convolved with the second half of that frequency band signal.

Stage DRECMF provides the watermark signal decoder output watermark data OWATD which correspond to the input watermark data IWATD.

The pseudo-noise sequences used are calculated by a given algorithm based on a start value. In order to transmit secret watermark data, the start value or even that algorithm can be encrypted and transmitted to the watermark signal decoder wherein it is used to calculate the decoder pseudo-noise sequences DECPNSEQ_i and the modified decoder pseudo-noise sequence MDECPNSEQ.

The invention claimed is:

1. A method performed by an apparatus for transmitting watermark data bits using a spread spectrum, said method including the steps:

modulating said watermark data bits on an encoder pseudo-noise sequence;

modulating said modulated encoder pseudo-noise sequence on a carrier frequency;

determining whether at one or more different candidate frequency band positions in a current frame of said audio signal the energy or amplitude level of said audio signal is such that it can mask one or more, respectively, of said modulated carrier frequencies and, if this is true, notch filtering said audio signal at the corresponding frequency band positions and inserting at this frequency or at each of these frequencies, respectively, said carrier frequency or one of said carrier frequencies, respectively;

checking at which candidate frequency band positions in a frame following said current frame of said audio signal the energy or amplitude level of said audio signal is such that it can mask one or more, respectively, of said modulated carrier frequencies, and providing information about the locations of these frequency band positions; and transmitting or transferring data of said current audio signal frame carrying said watermark data bits together with the information about the locations of the frequency band positions to be used in said frame following said current frame of said audio signal, wherein, in the frame following said current frame, no watermark signal carrier is transmitted in the frequency band or bands which have been occupied in said current frame, in order to decrease watermark data bit errors caused by echoes following reception of said audio signal.

2. The method according to claim 1, wherein one of an energy level and an amplitude level of one of said modulated carrier frequency and one of said modulated carrier frequencies is made such that it is masked by the energy or amplitude level of said audio signal at the corresponding frequency or frequencies, respectively.

3. A method performed by an apparatus for transmitting watermark data bits using a spread spectrum, said method including the steps:

modulating said watermark data bits on an encoder pseudo-noise sequence;

modulating said modulated encoder pseudo-noise sequence on a carrier frequency;

notch filtering a current frame of said audio signal at frequency band positions which are arranged in a pre-defined pattern across the sequence of frames of said audio signal and inserting at this frequency band position or at each of these frequency band positions, respectively, in said current frame of said audio signal said carrier frequency or one of said carrier frequencies, respectively, wherein said pattern is arranged such that in the frame following said current frame no watermark signal carrier is transmitted in the frequency band or bands which have been occupied in said current frame, in order to decrease watermark data bit errors caused by echoes following reception of said audio signal; and transmitting or transferring data of said current audio signal frame carrying said watermark data bits.

4. A method performed by an apparatus for regaining watermark data bits embedded in a spread spectrum, whereby the corresponding original watermark data bits were modulated at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, and wherein a current audio signal frame carrying said watermark data bits was transmitted or transferred together with information about the locations of the frequency band positions used for said carrier frequencies in a frame following said current frame of said audio signal, wherein, in the frame following said current frame, no watermark signal carrier was transmitted in the frequency band or bands which were occupied in said following frame, in order to decrease watermark data bit errors caused by echoes following reception of said audio signal, said method including the steps:

receiving and synchronising said transmitted or transferred audio signal;

demodulating for a current audio signal frame said carrier frequency or said carrier frequencies, respectively, thereby using said information about the location or locations of the frequency band position or positions used for said carrier frequency or frequencies, respectively, which information was attached to the data for a previous frame of said audio signal;

convolving said current frame of data of said audio signal with a time-inversed version of the encoder pseudo-noise sequence; and determining from the sign of the peak or the peaks of the corresponding convolution result the value of a bit of said watermark data.

5. A method performed by an apparatus for regaining watermark data bits embedded in a spread spectrum, whereby the corresponding original watermark data bits were modulated at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, whereby said frequency band positions were arranged in a pre-defined pattern across the sequence of frames of said audio signal, wherein said pattern was arranged such that in the frame following said current frame no watermark signal carrier was transmitted in the frequency band or bands which were occupied in said current frame, in order to decrease watermark data bit errors caused by echoes following reception of said audio signal, said method including the steps:

receiving and synchronising said transmitted or transferred audio signal;

demodulating for a current audio signal frame said carrier frequency or said carrier frequencies, respectively, thereby using the information about said pre-defined pattern;

convolving said current frame of data of said audio signal with a time-inversed version of the encoder pseudo-noise sequence; and determining from the sign of the peak or the peaks of the corresponding convolution result the value of a bit of said watermark data.

6. An apparatus for transmitting watermark data bits using a spread spectrum, said apparatus including:

means for modulating said watermark data bits on an encoder pseudo-noise sequence;

means for modulating said modulated encoder pseudo-noise sequence on a carrier frequency;

means for determining whether at one or more different candidate frequency band positions in a current frame of said audio signal the energy or amplitude level of said audio signal is such that it can mask one or more, respectively, of said modulated carrier frequencies and which means, if this is true, notch filter said audio signal at the corresponding frequency band positions and insert at this frequency or at each of these frequencies, respectively, said carrier frequency or one of said carrier frequencies, respectively, and which means check at which candidate frequency band positions in a frame following said current frame of said audio signal the energy or amplitude level of said audio signal is such that it can mask one or more, respectively, of said modulated carrier frequencies, and provide information about the locations of these frequency band positions; and means for transmitting or transferring data of said current audio signal frame carrying said watermark data bits together with the information about the locations of the frequency band positions to be used in said frame following said current frame of said audio signal, wherein, in the frame following said current frame, no watermark signal carrier is transmitted in the frequency band or bands which have been occupied in said current frame, in order to decrease watermark data bit errors caused by echoes following reception of said audio signal.

7. The apparatus according to claim 6, wherein one of an energy level and an amplitude level of one of said modulated carrier frequency and one of said modulated carrier frequencies is made such that it is masked by the energy or amplitude level of said audio signal at the corresponding frequency or frequencies, respectively.

8. An apparatus for transmitting watermark data bits using a spread spectrum, said apparatus including:
   means for modulating said watermark data bits on an encoder pseudo-noise sequence;
   means for modulating said modulated encoder pseudo-noise sequence on a carrier frequency;
   means for notch filtering a current frame of said audio signal at frequency band positions which are arranged in a pre-defined pattern across the sequence of frames of said audio signal, which means insert at this frequency band position or at each of these frequency band positions, respectively, in said current frame of said audio signal said carrier frequency or one of said carrier frequencies, respectively, wherein said pattern is arranged such that in the frame following said current frame no watermark signal carrier is transmitted in the frequency band or bands which have been occupied in said current frame, in order to decrease watermark data bit errors caused by echoes following reception of said audio signal; and
   means for transmitting or transferring data of said current audio signal frame carrying said watermark data bits.

9. An apparatus for regaining watermark data bits embedded in a spread spectrum, whereby the corresponding original watermark data bits were modulated at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, and wherein a current audio signal frame carrying said watermark data bits was transmitted or transferred together with information about the locations of the frequency band positions used for said carrier frequencies in a frame following said current frame of said audio signal, wherein, in the frame following said current frame, no watermark signal carrier was transmitted in the frequency band or bands which were occupied in said following frame, in order to decrease watermark data bit errors caused by echoes following reception of said audio signal, said apparatus including:
   means for receiving and synchronising said transmitted or transferred audio signal;
   means for demodulating for a current audio signal frame said carrier frequency or said carrier frequencies, respectively, thereby using said information about the location or locations of the frequency band position or positions used for said carrier frequency or frequencies, respectively, which information was attached to the data for a previous frame of said audio signal; and
   means for convolving said current frame of data of said audio signal with a time-inversed version of the encoder pseudo-noise sequence, which means determine from the sign of the peak or the peaks of the corresponding convolution result the value of a bit of said watermark data.

10. An apparatus for regaining watermark data bits embedded in a spread spectrum, whereby the corresponding original watermark data bits were modulated at encoder side on an encoder pseudo-noise sequence and said modulated encoder pseudo-noise sequence was modulated on a carrier frequency, and wherein at one or more different frequency band positions in a current frame of said audio signal the audio signal was notch filtered and one of said carrier frequencies was inserted instead, whereby said frequency band positions were arranged in a pre-defined pattern across the sequence of frames of said audio signal, wherein said pattern was arranged such that in the frame following said current frame no watermark signal carrier was transmitted in the frequency band or bands which were occupied in said current frame, in order to decrease watermark data bit errors caused by echoes following reception of said audio signal, said apparatus including:
   means for receiving and synchronising said transmitted or transferred audio signal;
   means for demodulating for a current audio signal frame said carrier frequency or said carrier frequencies, respectively, thereby using the information about said pre-defined pattern; and
   means for convolving said current frame of data of said audio signal with a time-inversed version of the encoder pseudo-noise sequence, which means determine from the sign of the peak or the peaks of the corresponding convolution result the value of a bit of said watermark data.

* * * * *